Oct. 26, 1943.  W. I. JONES  2,332,854

ROTARY OPERATIVE FASTENER

Filed May 15, 1942

Inventor:
Walter I. Jones.
by Preston C. Shaw
Atty.

UNITED STATES PATENT OFFICE 2,332,854

ROTARY OPERATIVE FASTENER

Walter I. Jones, Belmont, Mass., assignor to United-Carr Fastener Corporation, Cambridge, Mass., a corporation of Massachusetts Application May 15, 1942, Serial No. 443,067

3 Claims. (Cl. 24—221)

My invention aims to provide improvements in rotary operative type fasteners and relates more particularly to improvements in that portion of the fastener commonly called the spring member.

In the drawing which illustrates a preferred embodiment of my invention:

The fastener which I have selected for illustration of my invention is of the rotary operative type, and now more specifically known in the art as the cowling type of fastener, which is used in connection with securing two or more members together in overlapping relation where a strong and durable, yet easy operating, fastener is desired. The fastener illustrated is now a well-known construction with the exception of the improvements that I have made in the spring member and I believe that my improved sheet metal spring member is of such construction that it is more resilient and of longer life than previously known springs of this general type.

Figure 5:
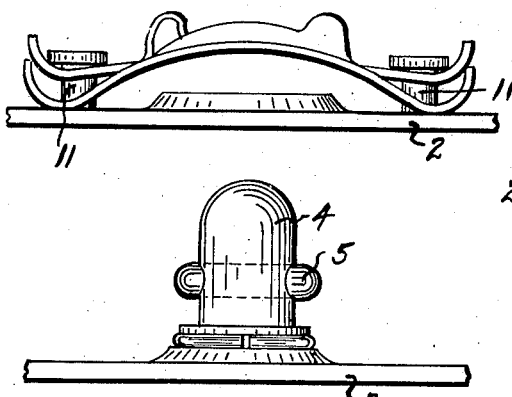
Fig. 5 is an edge side view of the installation shown in Fig. 1, but showing the parts before the stud is entered into engagement with the spring and spring-supporting member.
Figure 6:
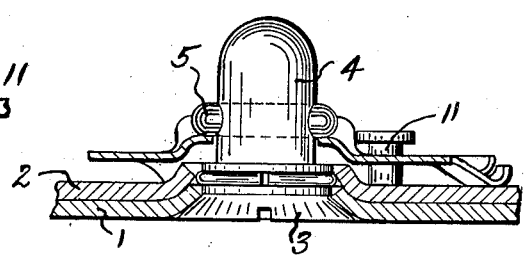
Fig. 6 is a section taken on the line 6—6 of Fig. 1.

Referring now to the specific construction illustrated by the drawing, I have shown two relatively thin supporting members 1 and 2, and to the supporting member 1 I have attached, through a preformed aperture, a stud member having a head 3 which may be either flush type, as shown in Fig. 6, or of any other suitable construction. The stud also has a shank 4 and a projecting means which may be a crosspin 5. To the supporting member 2 I have assembled, in line with a preformed aperture, my improved spring member 6 which is preferably formed from yieldable sheet metal and is also preferably longer than it is wide and substantially bowed from end to end lengthwise, as shown in Fig. 5.

The spring member is provided with a central stud-receiving aperture 7 and with slots 8—8 radiating from opposite sides thereof lengthwise of the spring. It is also provided with a central cam portion 9 which cooperates with the crosspin 5 in such a manner that, when the stud is rotated relative to the spring after it has been entered into engagement therewith, the parts of the fastener and supporting members will be secured tightly together. Therefore I have also shown depressions 9a—9a in the boss which receive the ends of the crosspin in fastener-locking position and also stock portions 10—10 to prevent too great a relative rotation of the stud relative to the spring. Thus the stud and spring members have inter-engaging elements that hold the fastener in locked position.

Figure 2:
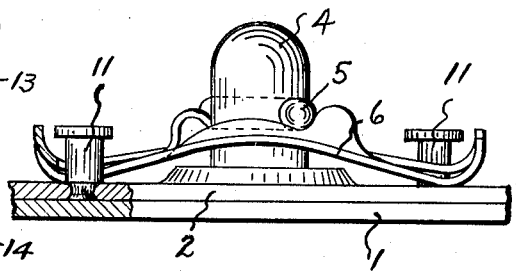
Fig. 2 is an edge side view of the installation shown in Fig. 1 with a small portion broken away to show the manner of attachment of the spring member to its supporting part.

The spring is attached to the supporting member 2 by means of shoulder rivets 11—11, as best shown in Fig. 2, and these rivets pass through the ends of the slot 8—8.

Figure 1:
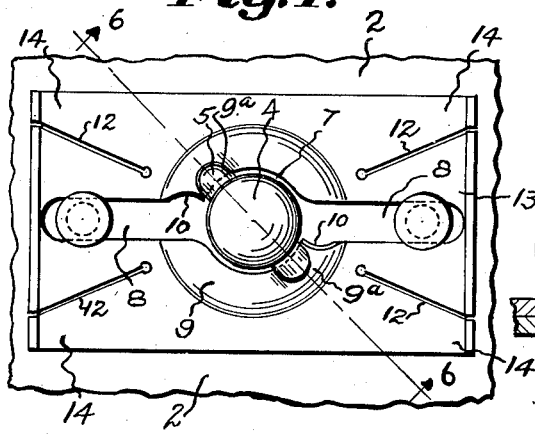
Fig. 1 is a bottom plan view of an installation showing my improved fastener member.
Figure 3:
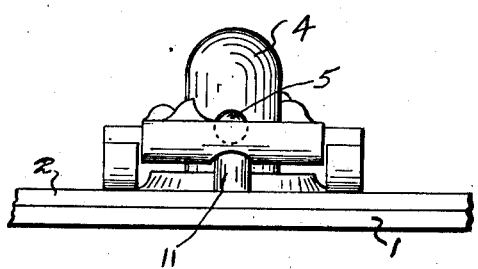
Fig. 3 is an edge end view of the installation shown in Fig. 1 with the parts illustrated in that relationship where the stud is in unlocked position with relation to the spring.
Figure 4:
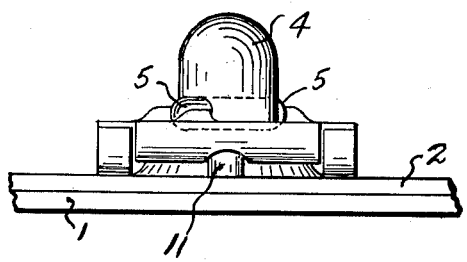
Fig. 4 is an edge end view similar to Fig. 3, but showing the parts in locked position.

So far I have described a spring which is not particularly new to me, but in order to improve that type of a spring I have provided at least two slits 12—12 in each end of the spring extending radially from the ends of the spring toward the center, as clearly shown in Fig. 1. Thus I have provided the end portions of my spring member with central fingers 13—13 and edge fingers 14—14 on opposite sides of each central finger 13. The fingers 14—14 are so constructed that they form continuations of the bowed shape of the spring (Fig. 5), while the central fingers 13—13 are preferably spaced in planes above the lowermost portions of the fingers 14—14. Thus I have provided less bearing surface than previous springs of this type while at the same time dividing the spring by the slits 12—12 so that there can be more independent yielding of various portions of the spring thereby increasing the number of times that the spring can be flexed before it will become broken or worn out. When the spring is flexed as by locking and unlocking the fastener the fingers 14—14 tend to flatten as the pin rides over the cam portion of the spring, while the central fingers 13—13 tend to move up and down relative to the rivets 11—11 with little or no flexing thereof except that flexing which might be caused when the main body portion of the spring is flexed. This relative flexing of the fingers is shown by a comparison of Figs. 5 and 2 and also by a comparison of Figs. 3 and 4.

While my invention appears to be a simple one, nevertheless, I have found from experimenting that the life of the spring is actually increased by my improved construction and while I have illustrated a preferred form and arrangement of the fingers at opposite ends of the spring I do not wish to be limited specifically thereby because my invention is best described by the following claims.

I claim:

1. A fastener of the rotary operative type including a stud member adapted to be attached to a part to be fastened, an oblong spring member adapted to be attached to another part to be fastened, inter-engaging elements provided by the stud and spring to hold the parts in fastened position when the stud member is rotated a predetermined amount, and said spring member being formed of sheet metal and being bowed to provide for compression thereof and each of the opposite ends of said spring being split into several fingers to increase the flexibility of said spring.

2. A fastener of the rotary operative type including a stud member adapted to be attached to a part to be fastened, an oblong spring member adapted to be attached to another part to be fastened, inter-engaging elements provided by the stud and spring to hold the parts in fastened position when the stud member is rotated a predetermined amount, and said spring member being formed of sheet metal and being bowed to provide for compression thereof and each of the opposite ends of said spring being split into several fingers to increase the flexibility of said spring, and some of said fingers being normally located in a different plane from the others.

3. A fastener of the rotary operative type including a stud member adapted to be attached to a part to be fastened, an oblong spring member adapted to be attached to another part to be fastened, inter-engaging elements provided by the stud and spring to hold the parts in fastened position when the stud member is rotated a predetermined amount, said spring member being formed of sheet metal and being bowed to provide for compression thereof and each of the opposite ends of said spring being divided into three fingers with the center finger in each group elevated with relation to the others so as to cut down the bearing surface and increase flexibility.

WALTER I. JONES.